United States Patent
Schut et al.

(10) Patent No.: US 8,964,024 B2
(45) Date of Patent: Feb. 24, 2015

(54) SYSTEM AND METHOD FOR CONTROLLING EXTERIOR VEHICLE LIGHTS RESPONSIVE TO DETECTION OF A SEMI-TRUCK

(71) Applicant: Gentex Corporation, Zeeland, MI (US)

(72) Inventors: Jeremy A. Schut, Grand Rapids, MI (US); David M. Falb, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 13/956,504

(22) Filed: Aug. 1, 2013

(65) Prior Publication Data
US 2014/0036080 A1    Feb. 6, 2014

Related U.S. Application Data

(60) Provisional application No. 61/678,658, filed on Aug. 2, 2012.

(51) Int. Cl.
*H04N 7/18* (2006.01)
*G06K 9/00* (2006.01)

(52) U.S. Cl.
CPC .............. *H04N 7/18* (2013.01); *G06K 9/00825* (2013.01)
USPC ......................................... 348/115; 348/113

(58) Field of Classification Search
CPC ................................ G01S 11/12; B63B 45/02
USPC ......................... 348/113–118, 148
See application file for complete search history.

(56) References Cited

U.S. PATENT DOCUMENTS 2,131,888 A    10/1938    Harris
2,632,040 A    3/1953    Rabinow
(Continued)

FOREIGN PATENT DOCUMENTS

DE    2946561    5/1981
FR    2641237    7/1990
(Continued)

OTHER PUBLICATIONS

Patent Cooperation Treaty, International Searching Authority, International Search Report, Written Opinion of the International Searching Authority and Notification of Transmittal, Dec. 19, 2013, 6 Pages.

(Continued)

*Primary Examiner* — Andy Rao
(74) *Attorney, Agent, or Firm* — Price Heneveld LLP; Scott P. Ryan

(57) ABSTRACT

An exterior light control system is provided for controlling exterior lights of a vehicle. The system includes an imaging system configured to image a forward external scene and to generate image data corresponding to the acquired images; and a controller configured to receive and analyze the image data and for generating an exterior light control signal that is used to control the exterior lights in response to analysis of the image data. The controller is further configured to analyze the image data to detect a semi-truck. When a semi-truck is detected, the controller generates an exterior light control signal that indicates the detection of a semi-truck or simply the presence of an oncoming vehicle. The controller may detect groups of lights belonging to a semi-truck other than headlamps, e.g., cab lights, so that a semi-truck may be detected even when the headlamps of the semi-truck are not detected due to being blocked by a roadside barrier.

13 Claims, 7 Drawing Sheets

(56) References Cited

U.S. PATENT DOCUMENTS

| | | | |
|---|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,139,801 A | 2/1979 | Linares |
| 4,151,526 A | 4/1979 | Hinachi et al. |
| 4,236,099 A | 11/1980 | Rosenblum |
| 4,258,979 A | 3/1981 | Mahin |
| 4,286,308 A | 8/1981 | Wolff |
| 4,357,558 A | 11/1982 | Massoni et al. |
| 4,376,909 A | 3/1983 | Tagami et al. |
| 4,479,173 A | 10/1984 | Rumpakis |
| 4,599,544 A | 7/1986 | Martin |
| 4,632,509 A * | 12/1986 | Ohmi et al. ................ 349/195 |
| 4,645,975 A | 2/1987 | Meitzler et al. |
| 4,665,321 A | 5/1987 | Chang et al. |
| 4,692,798 A | 9/1987 | Seko et al. |
| 4,716,298 A | 12/1987 | Etoh |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,934,273 A | 6/1990 | Endriz |
| 4,967,319 A | 10/1990 | Seko |
| 5,008,946 A | 4/1991 | Ando |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,235,178 A | 8/1993 | Hegyi |
| 5,289,321 A * | 2/1994 | Secor ................ 359/896 |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,396,054 A | 3/1995 | Krichever et al. |
| 5,402,170 A | 3/1995 | Parulski et al. |
| 5,416,318 A | 5/1995 | Hegyi |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,471,515 A | 11/1995 | Fossum et al. |
| 5,475,441 A | 12/1995 | Parulski et al. |
| 5,481,268 A | 1/1996 | Higgins |
| 5,483,346 A | 1/1996 | Butzer |
| 5,485,155 A | 1/1996 | Hibino |
| 5,508,592 A | 4/1996 | Lapatovich et al. |
| 5,537,003 A | 7/1996 | Bechtel et al. |
| 5,541,724 A | 7/1996 | Hoashi |
| 5,550,677 A | 8/1996 | Schofield et al. |
| 5,554,912 A | 9/1996 | Thayer et al. |
| 5,574,463 A | 11/1996 | Shirai et al. |
| 5,587,929 A | 12/1996 | League et al. |
| 5,592,146 A | 1/1997 | Kover, Jr. |
| 5,614,788 A | 3/1997 | Mullins et al. |
| 5,621,460 A | 4/1997 | Hatlestad et al. |
| 5,660,454 A | 8/1997 | Mori et al. |
| 5,666,028 A | 9/1997 | Bechtel et al. |
| 5,684,473 A | 11/1997 | Hibino et al. |
| 5,707,129 A | 1/1998 | Kobayashi |
| 5,710,565 A | 1/1998 | Shirai et al. |
| 5,714,751 A | 2/1998 | Chen |
| 5,715,093 A | 2/1998 | Schierbeek et al. |
| 5,736,816 A | 4/1998 | Strenke et al. |
| 5,751,832 A | 5/1998 | Panter et al. |
| 5,781,105 A | 7/1998 | Bitar et al. |
| 5,786,787 A | 7/1998 | Eriksson et al. |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,845,000 A | 12/1998 | Breed et al. |
| 5,867,214 A | 2/1999 | Anderson et al. |
| 5,877,897 A | 3/1999 | Schofield et al. |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,942,853 A | 8/1999 | Piscart |
| 5,990,469 A | 11/1999 | Bechtel et al. |
| 6,008,486 A | 12/1999 | Stam et al. |
| 6,018,308 A | 1/2000 | Shirai |
| 6,049,171 A | 4/2000 | Stam et al. |
| 6,097,023 A | 8/2000 | Schofield et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,166,698 A | 12/2000 | Turnbull et al. |
| 6,184,781 B1 | 2/2001 | Ramakesavan |
| 6,255,639 B1 | 7/2001 | Stam et al. |
| 6,281,632 B1 | 8/2001 | Stam et al. |
| 6,329,925 B1 | 12/2001 | Skiver et al. |
| 6,349,782 B1 | 2/2002 | Sekiya et al. |
| 6,356,376 B1 | 3/2002 | Tonar et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,442,465 B2 | 8/2002 | Breed et al. |
| 6,443,602 B1 | 9/2002 | Tanabe et al. |
| 6,465,962 B1 | 10/2002 | Fu et al. |
| 6,469,739 B1 | 10/2002 | Bechtel et al. |
| 6,483,438 B2 | 11/2002 | DeLine et al. |
| 6,491,416 B1 | 12/2002 | Strazzanti |
| 6,507,779 B2 | 1/2003 | Breed et al. |
| 6,550,943 B2 | 4/2003 | Strazzanti |
| 6,553,130 B1 | 4/2003 | Lemelson et al. |
| 6,558,026 B2 | 5/2003 | Strazzanti |
| 6,587,573 B1 | 7/2003 | Stam et al. |
| 6,611,610 B1 | 8/2003 | Stam et al. |
| 6,617,564 B2 | 9/2003 | Ockerse et al. |
| 6,631,316 B2 | 10/2003 | Stam et al. |
| 6,677,986 B1 | 1/2004 | Püchmüller |
| 6,772,057 B2 | 8/2004 | Breed et al. |
| 6,774,988 B2 | 8/2004 | Stam et al. |
| 6,861,809 B2 | 3/2005 | Stam |
| 6,902,307 B2 | 6/2005 | Strazzanti |
| 6,913,375 B2 | 7/2005 | Strazzanti |
| 6,946,978 B2 | 9/2005 | Schofield |
| 7,012,543 B2 | 3/2006 | DeLine et al. |
| 7,038,577 B2 | 5/2006 | Pawlicki et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,311,428 B2 | 12/2007 | DeLine et al. |
| 7,321,112 B2 | 1/2008 | Stam et al. |
| 7,400,266 B2 | 7/2008 | Haug |
| 7,417,221 B2 | 8/2008 | Creswick et al. |
| 7,446,650 B2 | 11/2008 | Scholfield et al. |
| 7,467,883 B2 | 12/2008 | DeLine et al. |
| 7,468,651 B2 | 12/2008 | DeLine et al. |
| 7,533,998 B2 | 5/2009 | Schofield et al. |
| 7,565,006 B2 | 7/2009 | Stam et al. |
| 7,567,291 B2 | 7/2009 | Bechtel et al. |
| 7,653,215 B2 | 1/2010 | Stam |
| 7,658,521 B2 | 2/2010 | DeLine et al. |
| 7,683,326 B2 | 3/2010 | Stam et al. |
| 7,719,408 B2 | 5/2010 | DeWard et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |

(56) References Cited

U.S. PATENT DOCUMENTS

| | | | |
|---|---|---|---|
| 7,881,839 B2 | 2/2011 | Stam et al. | |
| 7,888,629 B2 | 2/2011 | Heslin et al. | |
| 7,914,188 B2 | 3/2011 | DeLine et al. | |
| 7,972,045 B2 | 7/2011 | Schofield | |
| 7,994,471 B2 | 8/2011 | Heslin et al. | |
| 8,045,760 B2 | 10/2011 | Stam et al. | |
| 8,063,753 B2 | 11/2011 | DeLine et al. | |
| 8,063,759 B2 | 11/2011 | Bos et al. | |
| 8,090,153 B2 | 1/2012 | Schofield et al. | |
| 8,100,568 B2 | 1/2012 | DeLine et al. | |
| 8,116,929 B2 | 2/2012 | Higgins-Luthman | |
| 8,120,652 B2 | 2/2012 | Bechtel et al. | |
| 8,142,059 B2 | 3/2012 | Higgins-Luthman et al. | |
| 8,162,518 B2 | 4/2012 | Schofield | |
| 8,184,159 B2 * | 5/2012 | Luo | 348/148 |
| 8,203,433 B2 | 6/2012 | Deuber et al. | |
| 8,217,830 B2 | 7/2012 | Lynam | |
| 8,222,588 B2 | 7/2012 | Schofield et al. | |
| 8,258,433 B2 | 9/2012 | Byers et al. | |
| 8,325,028 B2 | 12/2012 | Schofield et al. | |
| 2002/0040962 A1 | 4/2002 | Schofield et al. | |
| 2003/0202357 A1 | 10/2003 | Strazzanti | |
| 2004/0125905 A1 | 7/2004 | Vlasenko et al. | |
| 2008/0044062 A1 | 2/2008 | Stam et al. | |
| 2008/0192132 A1 | 8/2008 | Bechtel et al. | |
| 2008/0294315 A1 | 11/2008 | Breed | |
| 2013/0028473 A1 | 1/2013 | Hilldore et al. | |
| 2014/0152826 A1 * | 6/2014 | Liken et al. | 348/148 |
| 2014/0198213 A1 * | 7/2014 | Liken et al. | 348/148 |

FOREIGN PATENT DOCUMENTS

| FR | 2726144 | 4/1996 |
|---|---|---|
| GB | 2313973 | 12/1997 |
| JP | 5744541 | 3/1982 |
| JP | 6015237 | 1/1985 |
| JP | 62131837 | 6/1987 |
| JP | 01233129 | 9/1989 |
| JP | 5139203 | 6/1993 |
| JP | 5342901 | 12/1993 |
| JP | 6151067 | 5/1994 |
| JP | 6267304 | 9/1994 |
| JP | 6276524 | 9/1994 |
| JP | 6295601 | 10/1994 |
| JP | 6321007 | 11/1994 |
| JP | 732936 | 2/1995 |
| JP | 747878 | 2/1995 |
| JP | 7052706 | 2/1995 |
| JP | 769125 | 3/1995 |
| JP | 8166221 | 6/1996 |
| JP | 8221700 | 8/1996 |
| JP | 132010020483 | 1/2010 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Löwenau, J.P. et al., SAE Paper No. 980007, "Adaptive Light Control—A New Light Concept Controlled by Vehicle Dynamics and Navigation," pp. 33-38.

Kormanyos, Christopher M., SAE Paper No. 980003, "HID System with Adaptive Vertical Aim Control," pp. 13-18.

Kalze, Franz-Josef, SAE Paper No. 980005, "Xenon Light for Main and Dipped Beam," pp. 23-26.

Shimizu, Tohru et al., SAE Paper No. 980322, "Development of PWM DRL with Low RF Emissions and Low Heat," pp. 113-117.

* cited by examiner

SYSTEM AND METHOD FOR CONTROLLING EXTERIOR VEHICLE LIGHTS RESPONSIVE TO DETECTION OF A SEMI-TRUCK

CROSS-REFERENCE TO RELATED APPLICATION

This application claims the priority benefit of U.S. Provisional Patent Application No. 61/678,658 entitled "SYSTEM AND METHOD FOR CONTROLLING EXTERIOR VEHICLE LIGHTS RESPONSIVE TO DETECTION OF A SEMI-TRUCK," filed on Aug. 2, 2012, by Jeremy Schut et al., the entire disclosure of which is incorporated herein by reference.

FIELD OF THE INVENTION

The present invention generally relates to a system and method for controlling exterior lights of a controlled vehicle, and more specifically relates to improvements in systems that control exterior lights of a controlled vehicle in response to the detection of other vehicles.

SUMMARY OF THE INVENTION

According to one aspect of the present invention, an exterior light control system is provided for controlling exterior lights of a controlled vehicle. The exterior light control system comprises: an imaging system configured to image a scene external and forward of the controlled vehicle and to generate image data corresponding to the acquired images; and a controller configured to receive and analyze the image data and for generating an exterior light control signal that is used to control the exterior lights in response to analysis of the image data, wherein the controller is further configured to analyze the image data to detect a semi-truck, and wherein, when a semi-truck is detected, the controller generates an exterior light control signal that indicates the detection of a semi-truck.

According to another aspect of the present invention, a method is provided for controlling exterior lights of a controlled vehicle comprising the steps of: imaging a scene external and forward of the controlled vehicle and generating image data corresponding to the acquired images; receiving and analyzing the image data in a processor to detect at least one characteristic of the image data including those of oncoming vehicles and to detect an oncoming semi-truck having headlamps that are not detected; generating a control signal that is used to control the exterior lights in response to analysis of the image data; and generating a control signal for reducing the brightness of the exterior lights if an oncoming semi-truck is detected.

According to another aspect of the present invention, a non-transitory computer readable medium is provided having stored thereon software instructions that, when executed by a processor, cause the processor to generate control signals for controlling exterior lights of a controlled vehicle, by executing the steps comprising: imaging a scene external and forward of the controlled vehicle and generating image data corresponding to the acquired images; receiving and analyzing the image data in the processor to detect at least one characteristic of the image data to detect an oncoming semi-truck; and generating a control signal from the processor that is used to control the exterior lights in response to analysis of the image data wherein, when a semi-truck is detected, the control signal indicates the detection of a semi-truck.

These and other features, advantages, and objects of the present invention will be further understood and appreciated by those skilled in the art by reference to the following specification, claims, and appended drawings.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

Figure 1:
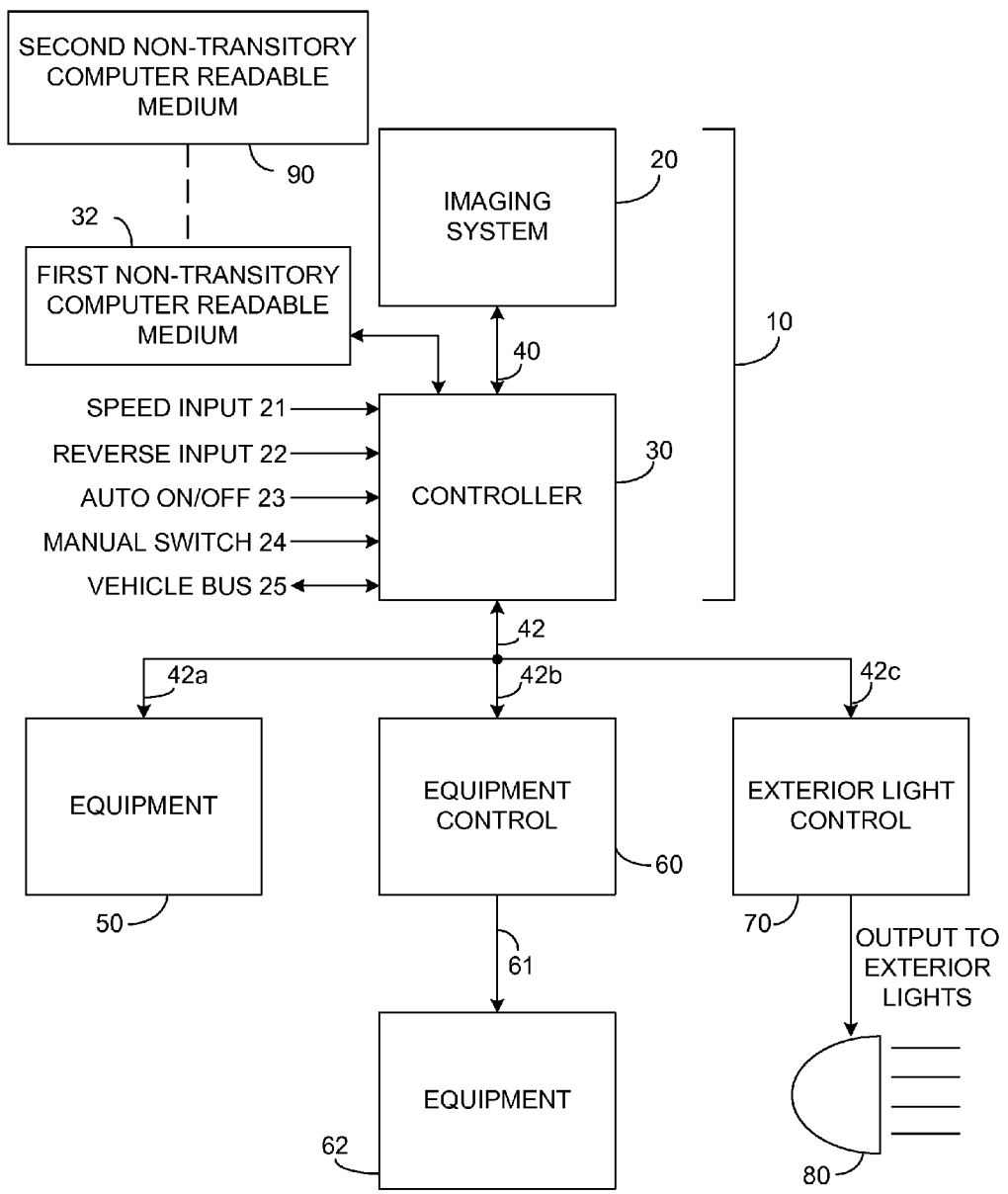
FIG. 1 is a block diagram of a system constructed according to one embodiment.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an exterior light control system for controlling exterior lights of a controlled vehicle in response to image data acquired from an image sensor, which captures images forward of the vehicle. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high-beam state (or some state other than a low-beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, as well as in U.S. patent application Ser. No. 13/432,250 entitled "VEHICULAR IMAGING SYSTEM AND METHOD FOR DETERMINING ROADWAY WIDTH" and filed on Mar. 28, 2012, by Jeremy A. Schut et al., the entire disclosures of which are incorporated herein by reference.

U.S. patent application Ser. No. 13/432,250 entitled "VEHICULAR IMAGING SYSTEM AND METHOD FOR DETERMINING ROADWAY WIDTH" filed on Mar. 28, 2012, by Jeremy A. Schut et al. discloses an exterior light control system that improves upon the prior systems by determining a road model based on the roadway width and roadway type (i.e., motorway, two-lane road, multi-lane road, etc.) in order to more accurately discriminate between other vehicles and non-vehicle light sources, reflectors, and road signs and to allow different modes of operation depending upon the type of roadway on which the controlled vehicle is traveling. More specifically, the roadway width may be estimated from various objects detected in the forward scene, including lane markers, reflectors, road signs, and any other objects that may be useful to detect the edges of the road. The roadway type may be determined from the roadway width. Other vehicle parameters such as vehicle speed, yaw, roll, steering wheel position and vehicle direction, may also be used when determining the roadway type and the road model. Then, using the road model, the system may track the positioning (or "world positioning") relative to the controlled vehicle, the movement, the brightness, the size, the color, and other characteristics of various detected light sources to determine if the light sources appear to be on the roadway. If so, the light sources are more likely to be another vehicle to which the system responds by appropriately controlling the exterior lights.

One of the modes in which the exterior lighting control systems may operate is a motorway mode. The motorway mode is selected when the system determines that the controlled vehicle is traveling on a motorway (i.e., an expressway or divided highway). In the motorway mode, the system may not be responsive to oncoming vehicles because the presence of a guard rail or other barrier in the median blocks the headlamps of oncoming vehicles making them hard to detect. However, such barriers also block light from the controlled vehicle that would otherwise cause glare to drivers of oncoming vehicles. Examples of exterior light control systems that detect motorways and operate in a motorway mode are disclosed in U.S. Pat. Nos. 6,861,809 and 8,045,760, the entire disclosures of which are incorporated herein by reference.

A problem has been found to exist in that semi-truck drivers can experience glare from bright exterior lights of oncoming vehicles even when driving on a motorway with a barrier in the median due to the height of the cab of the semi-truck. Thus, the prior systems which did not detect oncoming vehicles if their headlamps were blocked by such a barrier also did not reduce the brightness of the exterior lights, thereby tending to cause excessive glare to the drivers of oncoming semi-trucks whose headlamps are also blocked by the barrier.

Accordingly, the exterior light control system of the present invention is capable of detecting oncoming semi-trucks despite being unable to detect their headlamps due to a barrier, and responds to the presence of an oncoming semi-truck by reducing the brightness of the exterior lights as perceived by the semi-truck driver. More specifically, the system may reduce or suggest the reduction of the brightness of the exterior lights in response to detection of a semi-truck while in a motorway mode even when headlamps of the semi-truck are not detected.

As explained in further detail below, the system looks for lights on the semi-truck cabs and/or trailers by detecting groupings of lights that are in the forward scene and are positioned in such a way within the image frame that they are within a defined range of one another relative to the world surrounding the controlled vehicle and its image sensor. The system may further determine whether the positions of the lights within the group change in position from one image frame to the next in a relative manner suggesting that the lights of the group are moving collectively together. Once such a group of lights is detected, the system may determine if the color and/or brightness of the lights meets certain thresholds that further suggest the presence of a semi-truck (i.e., consistent colors of the lights in the group). The distance to the light sources may then be determined to serve as an indicator as to whether the semi-truck is close enough to justify reducing the perceived brightness of the exterior lights in at least the direction of the detected semi-truck. Further, the relative position of the detected semi-truck may be compared to a road model for oncoming traffic to determine whether the detected semi-truck is, in fact, travelling along the same path as other oncoming vehicles.

Such road models may be determined by analyzing the relative world positions of prior oncoming traffic as detected by the system. Road models may also be determined using the controlled vehicle's navigational system. The road model may also allow the system to determine the relative height of the lights so as to determine if they are likely on a semi-truck cab or trailer. A system for determining a road model is disclosed in U.S. patent application Ser. No. 13/432,250 entitled "VEHICULAR IMAGING SYSTEM AND METHOD FOR DETERMINING ROADWAY WIDTH" and filed on Mar. 28, 2012, the entire disclosure of which is incorporated herein by reference.

A first embodiment of an exterior light control system 10 is shown in FIG. 1. Exterior light control system 10 is provided for controlling exterior lights 80 and, optionally, other equipment (50, 62) of a controlled vehicle. System 10 includes an imaging system 20 and a controller 30. Imaging system 20 includes an image sensor (201, FIG. 2) that is configured to image a scene external and forward of the controlled vehicle and to generate image data corresponding to the acquired images. Controller 30 receives and analyzes the image data and generates an exterior light control signal that is used to control exterior lights 80 and may generate control signals to control any additional equipment (50, 62). These control signals are generated in response to analysis of the image data.

Controller 30 may be configured to directly connect to the equipment (50) being controlled such that the generated control signals directly control the equipment. Alternatively, controller 30 may be configured to connect to an equipment control (60 and 70), which, in turn, is connected to the equipment being controlled (62 and 80) such that the control signals generated by controller 30 only indirectly control the equipment. For example, in the case of the equipment being exterior lights 80, controller 30 may analyze the image data from imaging system 20 so as to generate control signals that are more of a recommendation for an exterior light control 70 to use when controlling exterior lights 80. The control signals may further include not just a recommendation, but also a code representing a reason for the recommendation so that equipment controls 60 and 70 may determine whether or not to override a recommendation. Further, as described in detail below, the control signal may include an indication of the detection of a semi-truck. Such a semi-truck detection indication is particularly useful when an equipment control (60 and 70) that is separate from controller 30 performs the direct control of the equipment.

By providing a semi-truck detection indication, controller 30 provides additional information to exterior light control 70 and/or equipment control 60 that was not previously made available to such equipment controls. This allows the vehicle manufacturer more flexibility in how they choose to respond to the semi-truck detection indication. Examples of which are to turn the high beam lighting off; extend the delay following a determination that the semi-truck is no longer detected so as to delay turning the high beam lighting back on; only reduce the brightness of the exterior lights in the direction of the semi-truck so as to create a "tunnel" through which the semi-truck is traveling; extend the delay for which time the "tunnel" is created; and/or to simply respond in the same manner as if an oncoming vehicle were otherwise detected. If the system is going to respond in the same manner as to any detected oncoming vehicle, the semi-truck detection indication may instead be a vehicle detection indication.

The present imaging system improves upon the above-mentioned exterior light control systems by providing a system that allows auto manufacturers to respond in a manner of their choosing to the semi-truck detection indication. This also allows one common system to be used for all manufacturers regardless of whether they wish to change or maintain a particular illumination pattern in response to such an indication. Further, different features of equipment control may be enabled or disabled based upon the detection of an oncoming semi-truck. In addition, different equipment may respond differently to the semi-truck detection indication.

As shown in FIG. 1, various inputs (such as inputs 21-24) may be provided to controller 30 that may be taken into account in forming a recommendation or direct control signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow imaging system 20 to be located in the best location in the vehicle for obtaining images, which may be a distance from the equipment to be controlled and to allow communication over the vehicle bus 25.

According to one embodiment, the equipment that system 10 controls may include one or more exterior lights 80 and the control signal generated by controller 30 may be an exterior light control signal. In this embodiment, exterior lights 80 may be controlled directly by controller 30 or by an exterior light control 70, which receives a control signal from controller 30. As used herein, the "exterior lights" broadly include any exterior lighting on the vehicle. Such exterior lights may include headlamps (both low and high beam if separate from one another), tail lights, foul weather lights such as fog lights, brake lights, center-mounted stop lights (CHMSLs), turn signals, back-up lights, etc. The exterior lights may be operated in several different modes including conventional low-beam and high-beam states. They may also be operated as daytime running lights, and additionally as super-bright high beams in those countries where they are permitted.

The exterior light brightness may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imaging system 20 may be any conventional system. Examples of suitable imaging systems are disclosed in published United States Patent Application Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imaging system includes an image sensor (or camera) to capture images that may then be displayed and/or analyzed in order to control vehicle equipment in addition to exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., the entire disclosures of which are incorporated herein by reference.

In the example shown in FIG. 1, imaging system 20 may be controlled by controller 30. Communication of imaging system parameters as well as image data occurs over communication bus 40, which may be a bi-directional serial bus, parallel bus, a combination of both, or other suitable means. Controller 30 serves to perform equipment control functions by analyzing images from imaging system 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Controller 30 may control the imaging system to be activated in several different modes with different exposure times and different readout windows. Controller 30 may be used to both perform the equipment or exterior light control function and control the parameters of imaging system 20.

Controller 30 can also take advantage of the availability of signals (such as vehicle speed and yaw) communicated via discrete connections or over the vehicle bus 25 in making decisions regarding the operation of the exterior lights 80. In particular, speed input 21 provides vehicle speed information to the controller 30 from which speed can be a factor in determining the control state for the exterior lights 80 or other equipment. The reverse signal 22 informs controller 30 that the vehicle is in reverse, responsive to which the controller 30 may clear an electrochromic mirror element regardless of signals output from light sensors. Auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Controller 30 can control, at least in part, other equipment 50 within the vehicle which is connected to controller 30 via vehicle bus 42. Specifically, the following are some examples of one or more equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. The controller 30 may also use a second controller (or controllers), equipment control 60, which may be located in a rearview assembly or elsewhere in the vehicle in order to control certain kinds of equipment 62. Equipment control 60 can be connected to receive via vehicle bus 42 control signals generated by controller 30. Equipment control 60 subsequently communicates and controls equipment 62 via bus 61. For example, equipment control 60 may be a windshield wiper control unit which controls windshield wiper equipment, turning this equipment ON or OFF. Equipment control may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with controller 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation system, a vehicle speed, interior lights, rearview mirrors, an audio system, a climate control, an engine control, and various other switches and other display devices that may be located throughout the vehicle.

Figure 2:
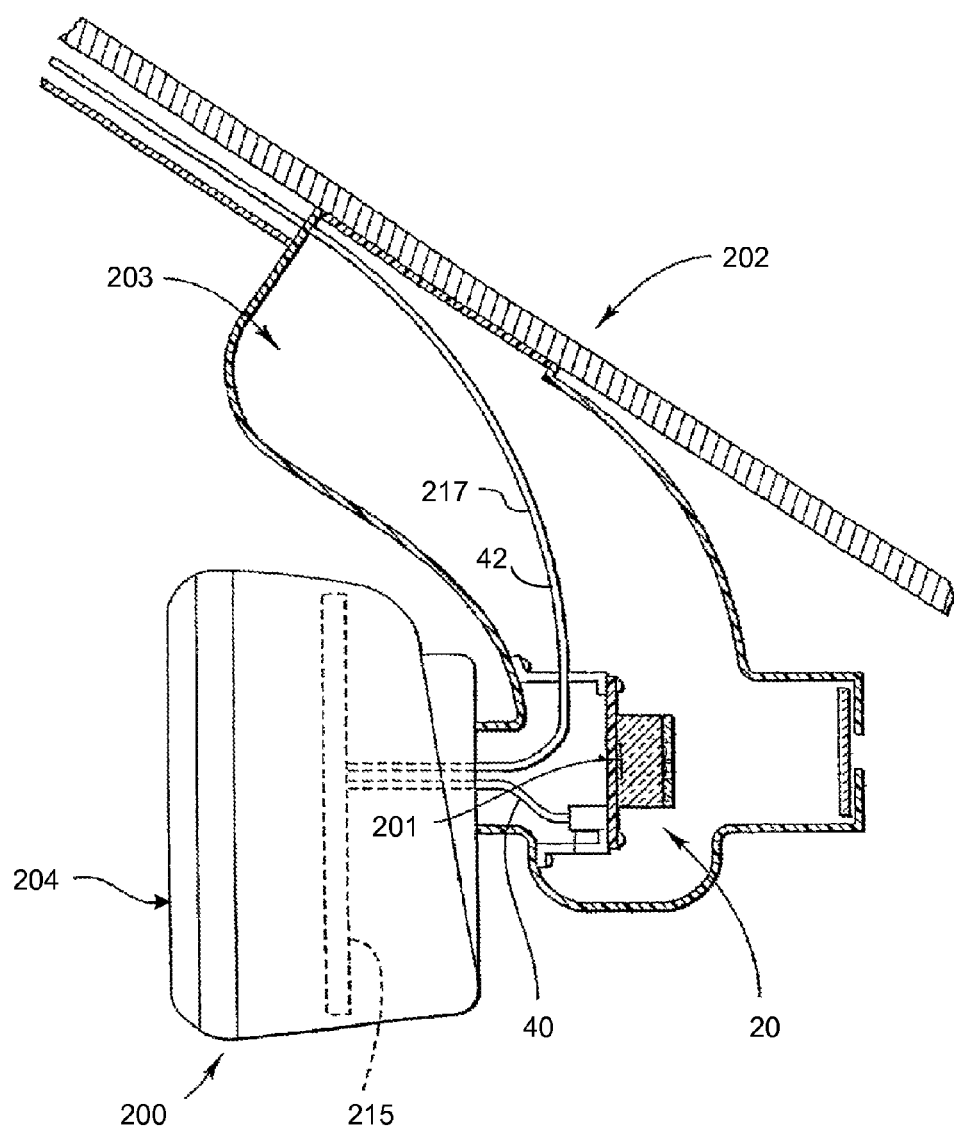
FIG. 2 is a partial cross section of a rearview assembly incorporating a system in accordance with another embodiment.

Portions of system 10 can be advantageously integrated into a rearview assembly 200 as illustrated in FIG. 2, wherein imaging system 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imaging system 20 in the rearview assembly permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor with the exception of an aperture through which light is received from a forward external scene.

Controller 30 of FIG. 1 may be provided on a main circuit board 215 and mounted in rearview housing 204 as shown in FIG. 2. As discussed above, controller 30 may be connected to imaging system 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The method for controlling exterior lights of a controlled vehicle will now be described with reference to FIGS. 3A-5. This method is described below as being implemented by controller 30 using image data received from imaging system 20. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of controller 30 (or locally associated with controller 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

Figure 3A:
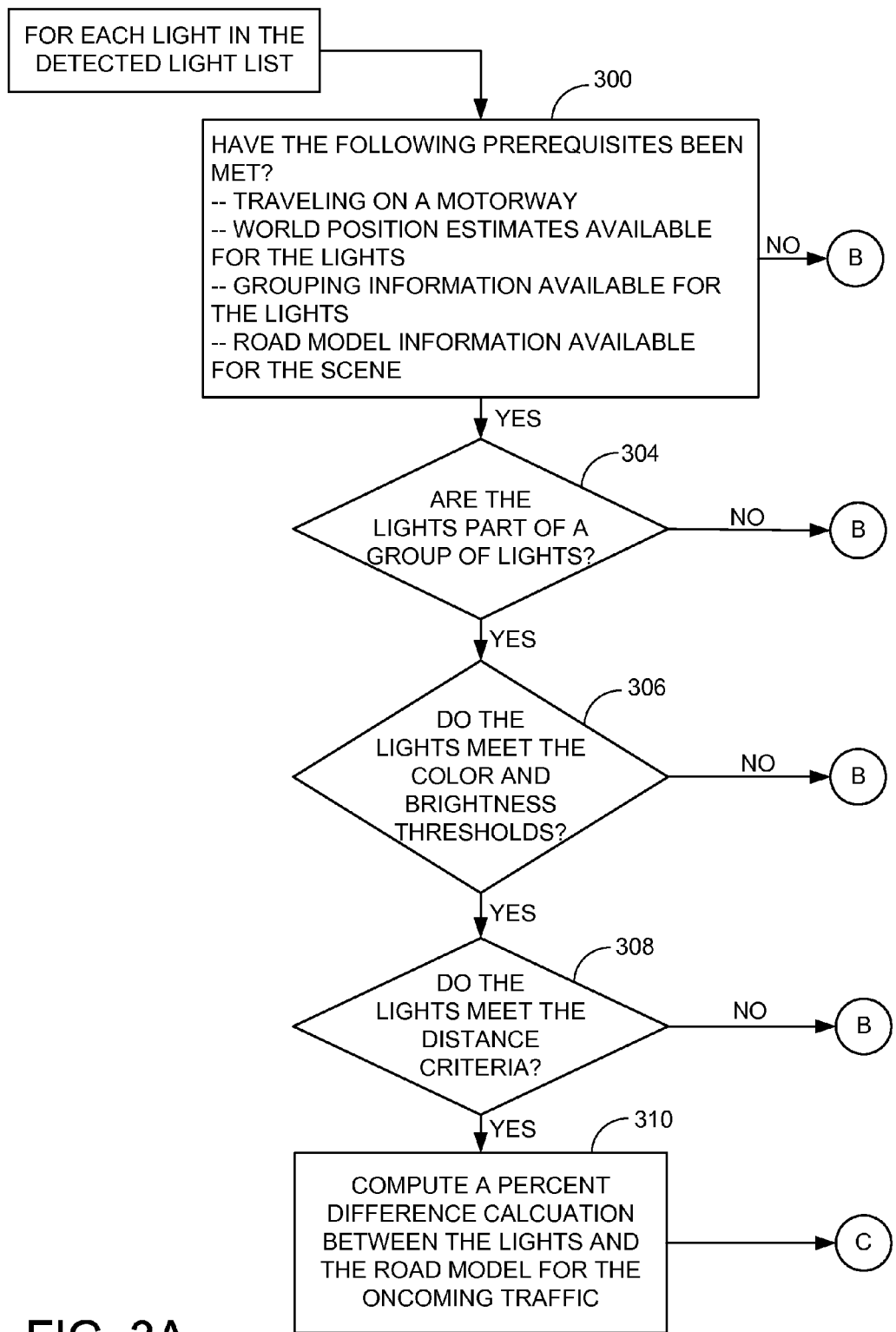
FIGS. 3A and 3B are a flow chart illustrating a routine for detecting oncoming vehicles.
Figure 3B:
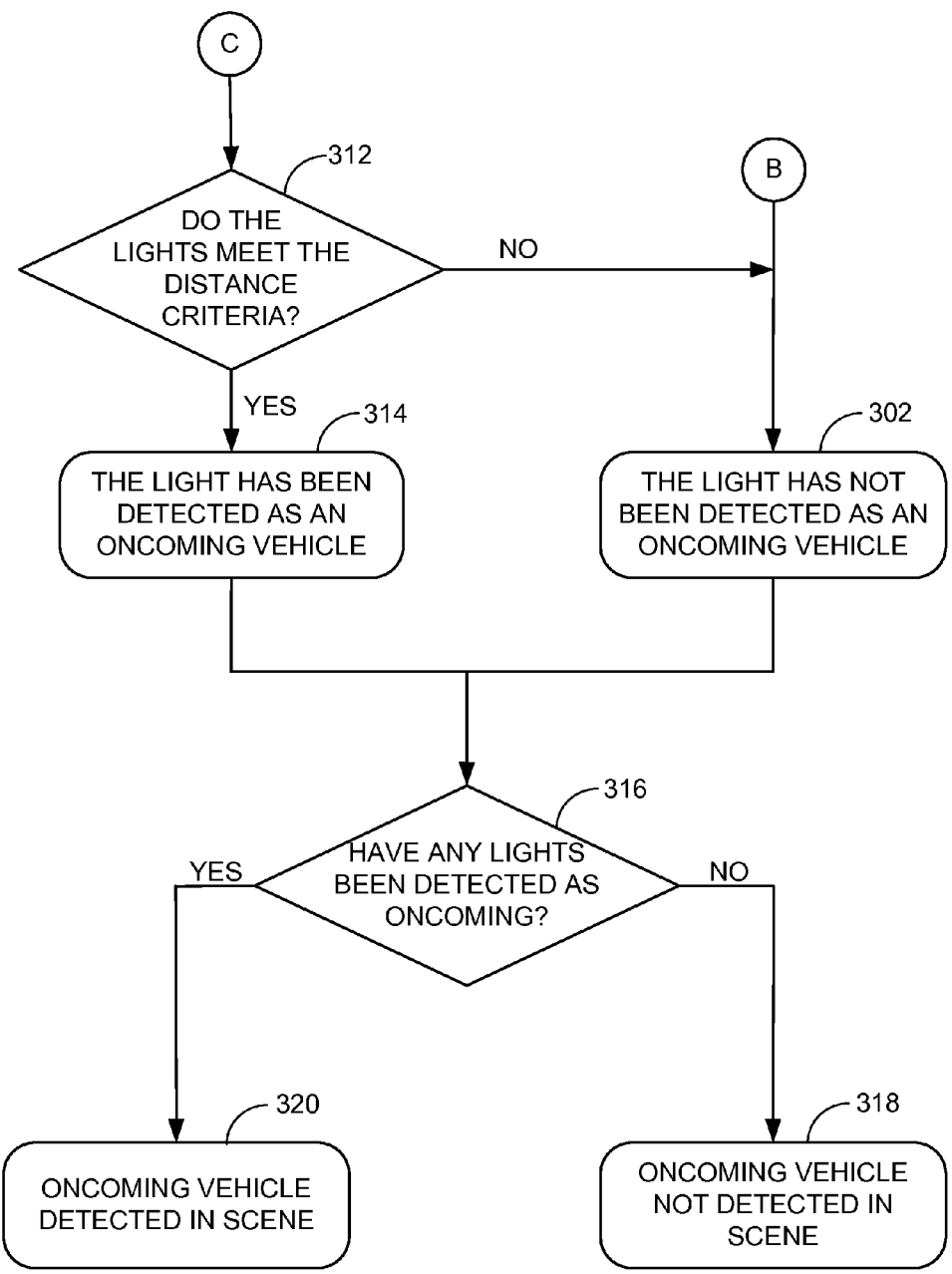

FIGS. 3A and 3B show a general flow chart illustrating various steps to be executed by controller 30. As shown in FIG. 3A, the method may begin with step 300 in which controller 30 determines whether certain prerequisites have been met for determining if there is an oncoming vehicle of concern (i.e., a semi-truck) when in a motorway mode relative to each light in the detected light list. In particular, controller 30 determines (a) whether it is in a motorway mode, (b) if world position estimates are available for the lights in the detected light list, (c) if grouping information is available for the lights, and (d) if road model information is available for the scene. If these prerequisites have not been met, controller 30 will advance to step 302 (FIG. 3B) in which it determines that the light in the light list is not representative of an oncoming vehicle. If these prerequisites have been met, controller 30 will advance to step 304.

In step 304, controller 30 determines whether the light in the light list is part of a group of lights. Details of an example how this is determined is described below with respect to FIGS. 4A and 4B. If the light is not part of a group of lights, controller 30 proceeds to step 302 in which it determines that the light in the light list is not representative of an oncoming vehicle. If the light is part of a group of lights, controller 30 then determines whether the group of lights meets certain color and brightness thresholds in step 306.

If, in step 306, controller 30 determines that the group of lights does not meet certain color and brightness thresholds, controller 30 advances to step 302. Otherwise, controller 30 advances to step 308 in which it determines whether the group of lights meets certain distance criteria. Such distance criteria may, for example, be that the group of lights is between about 5 meters and about 200 meters. If the group of lights does not meet the distance criteria, controller 30 proceeds to step 302. If the group of lights does meet the distance criteria, controller 30 computes a percent difference calculation between the lights and the road model for oncoming traffic in step 310. This calculation determines the likelihood that the group of lights is within the area where oncoming traffic is expected.

Controller 30 next determines in step 312 (FIG. 3B) whether the percent difference is below a defined threshold to thereby indicate that the group of lights is likely within the area where oncoming traffic is expected. As an example, the percent difference threshold may be about 60. If the percent difference is above the defined threshold, controller 30 advances to step 302 where controller 30 makes the determination that the light detected in the light list is not an oncoming vehicle. If the percent difference is below the defined threshold, controller 30 proceeds to step 314 where controller 30 makes the determination that the light detected in the light list is an oncoming vehicle in the form of a semi-truck.

After looping through steps 300-314 for each light in the detected light list (or perhaps only until the first oncoming vehicle is detected in step 314), controller 30 proceeds to step 316 where it determines if any lights have been detected as oncoming. If not, controller 30 determines that an oncoming vehicle has not been detected in the scene in step 318. If any lights have been detected as oncoming, controller 30 determines in step 320 that an oncoming vehicle in the form of a semi-truck has been detected in the scene and controller 30 responds by generating a control signal indicating the detection of a semi-truck. Exterior light control 70 may respond to this semi-truck detection indication by reducing the brightness of the exterior lights 80 at least as projected in the direction of the detected semi-truck.

Figure 4A:
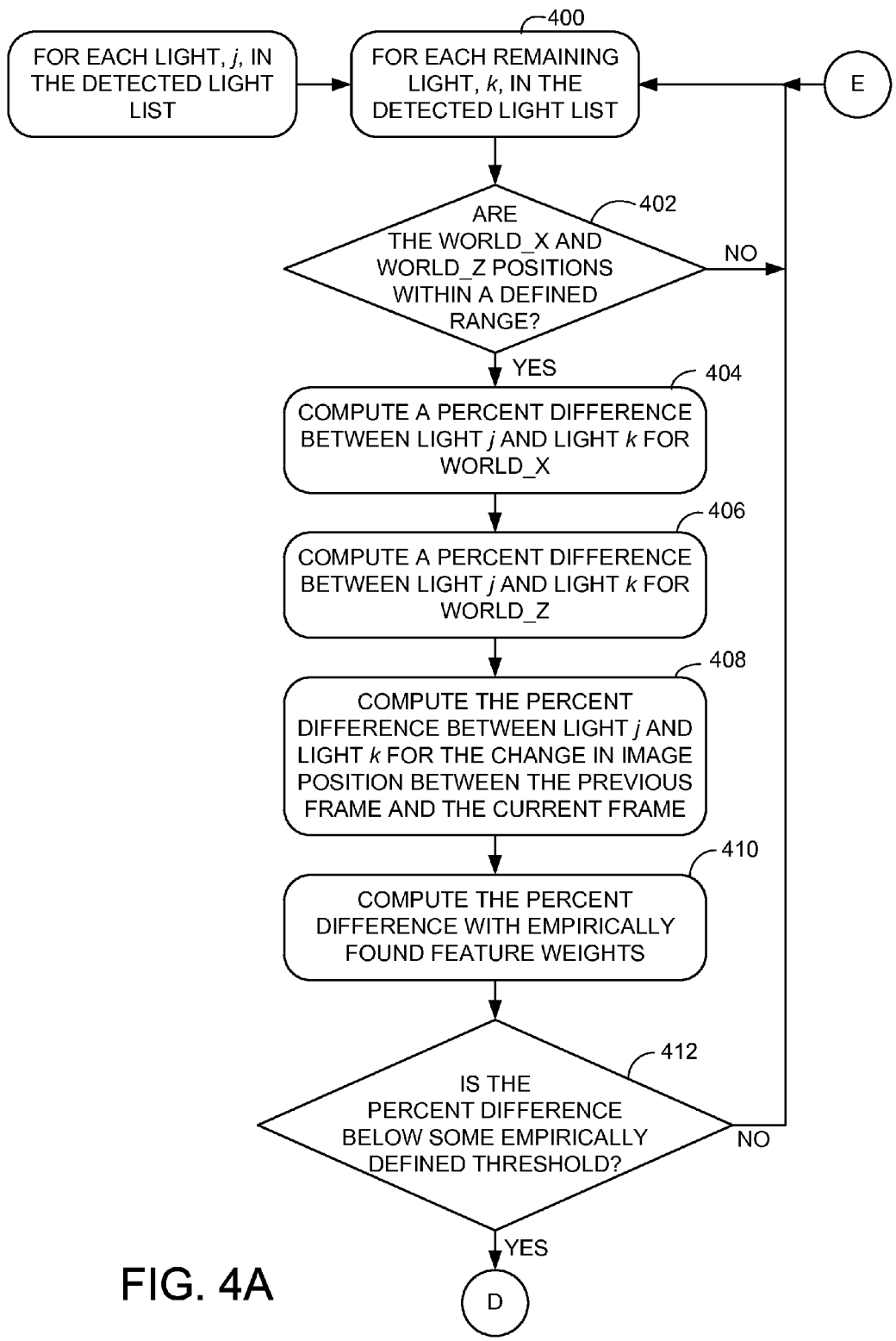
FIGS. 4A and 4B are a flow chart illustrating a routine for detecting groupings of lights of an oncoming vehicle.
Figure 4B:
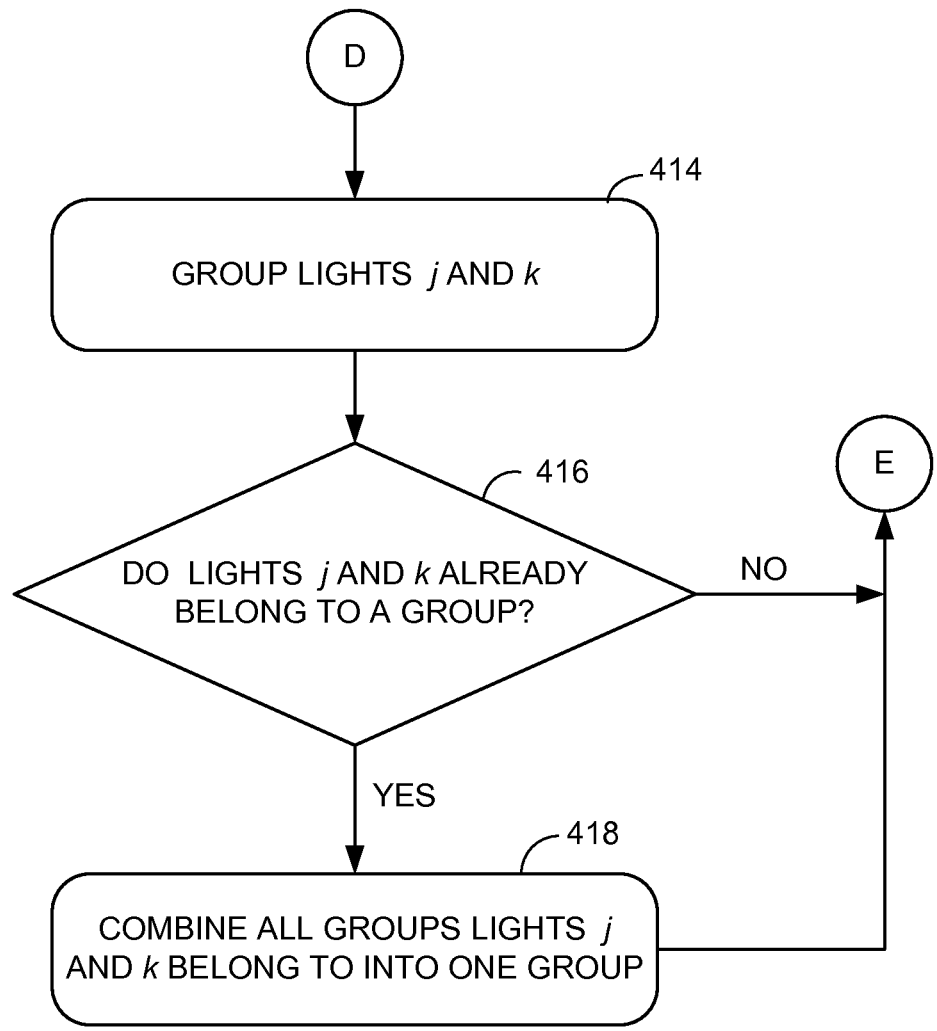
Figure 5:
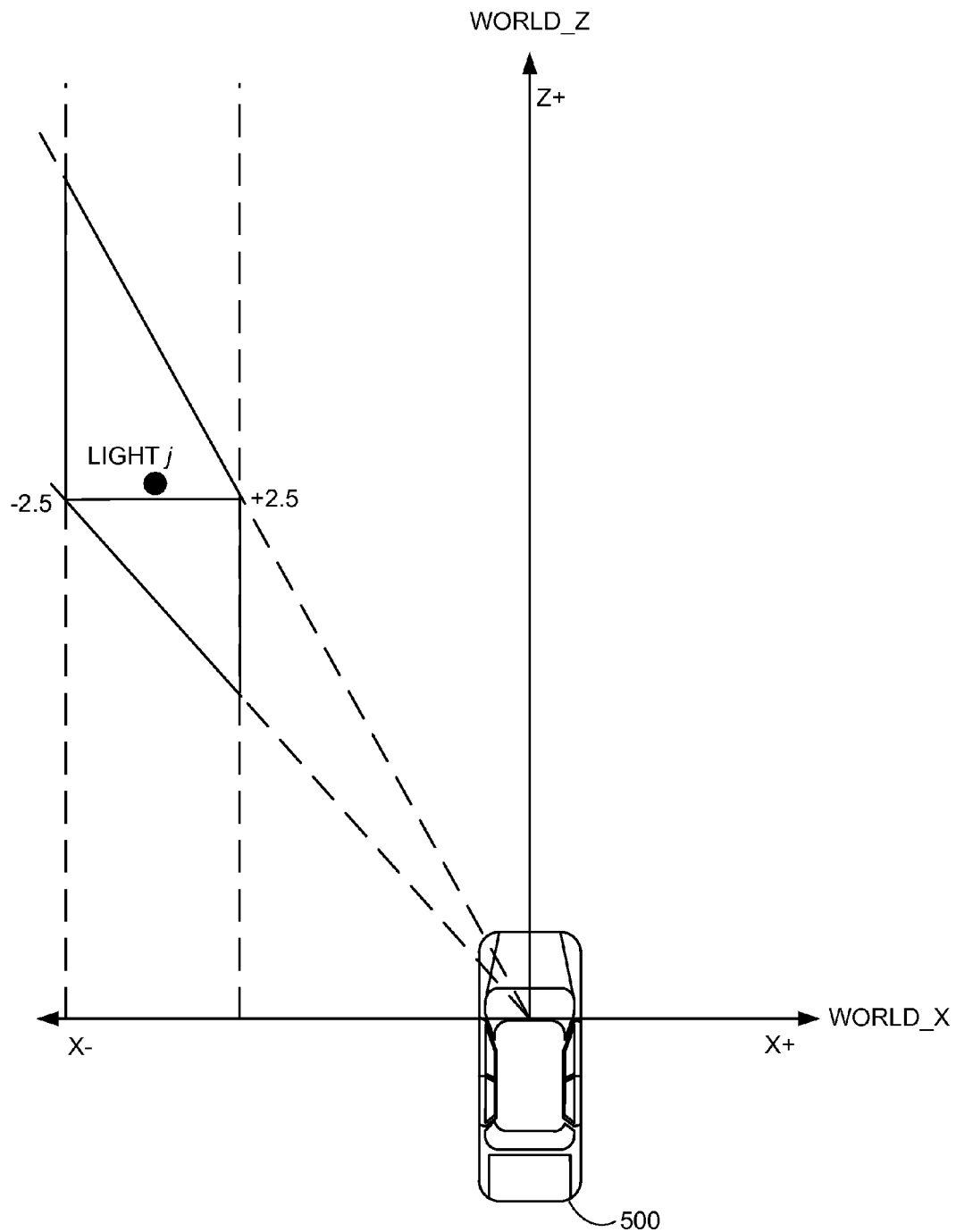
FIG. 5 is a top plan view of a vehicle illustrating a world coordinate system.

As mentioned with respect to step 304 in FIG. 3A, an oncoming semi-truck may be detected if, amongst other variables, the controller 30 has identified a group of lights. FIGS. 4A and 4B illustrate a routine by which controller 30 may identify groups of lights. In this routine, controller 30 analyzes each light j in the detected light list relative to each remaining light k in the detected light list (step 400). Controller 30 determines in step 402 whether the World_X and World_Z positions of light j and light k are within a defined range. As shown in FIG. 5, the "World" is defined relative to the controlled vehicle 500 where positions in this relative World may be designated using the coordinates World_X, which is a direction lateral to the vehicle 500, and World_Z, which is a direction longitudinal to the vehicle 500 (or in the direction of travel). By determining if the positions of two light sources are within a defined range, the controller is determining whether they could possibly be associated with the same semi-truck.

If, in step 402, controller 30 determines that the light k is not within a defined range of light j (of, for example, 2.5 meters laterally), controller 30 returns to step 400 to select the next remaining light k within the detected light list and again executes step 402. To compute whether the light k is within a defined range of light j, controller 30 determines whether a tan ($Light_j$[World_X]+2.5 m/$Light_j$[World_Z]) and a tan ($Light_j$[World_X]−2.5 m/$Light_j$[World_Z]). Controller 30 thus continues to loop through steps 400 and 402 until either a light k is found that is within the defined range of light j, or there are no lights k left in the list. In the latter case, controller 30 then selects a new light j and continues the process of steps 400 and 402 for the new light j and the remaining lights k in the light list.

If a light k is found that is within the defined range of light j, controller 30 proceeds to execute computational steps 404 through 410. In step 404, controller 30 computes a percent difference between the positions of light j and light k in World_X. In step 406, controller 30 computes a percent difference between the positions of light j and light k in World_Z. In step 408, controller 30 computes a percent difference between the positions of light j and light k for the change in image position in the previous frame and in the current frame captured by the image sensor. In step 410, the percent differences computed in steps 404-408 are combined with empirically found feature weights.

After step 410, controller 30 determines whether the combined percent difference is below an empirically defined threshold in step 412. This combined percent difference threshold may, for example, be about 20. If so, controller 30 groups light j and light k in step 414 (FIG. 4B). If not, controller 30 does not group these particular lights and returns to step 400 to select the next light k.

Following step 414, controller 30 then determines whether light j or light k already belongs in a group of lights. If so, controller combines all groups of lights to which lights j and k belong into one group in step 418 before returning to step 400 to process the next light k relative to the current light j. If light j or light k does not already belong in a group of lights, controller returns to step 400.

The routine in FIGS. 4A and 4B is thus repeated for each light j in the detected light list.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An exterior light control system for controlling exterior lights of a controlled vehicle, comprising:
    an imaging system configured to image a scene external and forward of the controlled vehicle and to generate image data corresponding to the acquired images; and
    a controller configured to receive and analyze the image data and for generating an exterior light control signal that is used to control the exterior lights in response to analysis of the image data,
    wherein said controller is further configured to analyze the image data to detect a semi-truck, wherein, when a semi-truck is detected, said controller generates an exterior light control signal that indicates the detection of a semi-truck; and wherein said controller is further configured to analyze the image data to detect a semi-truck even when headlamps of the semi-truck are not detected.

2. The exterior light control system of claim 1 wherein:

said controller generates an exterior light control signal in response to analysis of the image data and in response to a selected mode of operation, wherein one selected mode of operation is a motorway mode, and when in the motorway mode, if said controller detects a semi-truck, said controller generates an exterior light control signal for reducing the brightness of the exterior lights.

3. The exterior light control system of claim 1, wherein said controller detects a semi-truck by detecting groups of lights other than headlamps.

4. The exterior light control system of claim 3, wherein said controller determines that detected lights belong in a group by determining whether the lights are within a defined range of one another.

5. The exterior light control system of claim 3, wherein said controller determines that detected lights belong in a group by determining whether positions of the lights change collectively together over time.

6. The exterior light control system of claim 3, wherein said controller determines that detected lights belong in a group by determining whether the lights have at least one of color and brightness levels within threshold levels of one another.

7. The exterior light control system of claim 3, wherein said controller determines a position of a detected group of lights relative to a road model to determine if the group of lights are those of a semi-truck.

8. A method for controlling exterior lights of a controlled vehicle, comprising:

imaging a scene external and forward of the controlled vehicle and generating image data corresponding to the acquired images;

receiving and analyzing the image data in a processor to detect at least one characteristic of the image data including those of oncoming vehicles and to detect an oncoming semi-truck having headlamps that are not detected;

generating a control signal that is used to control the exterior lights in response to analysis of the image data;

generating a control signal for reducing the brightness of the exterior lights if an oncoming semi-truck is detected; and wherein the step of receiving and analyzing the image data to detect an oncoming semi-truck detecting a semi-truck includes detecting groups of lights other than headlamps.

9. A non-transitory computer readable medium encoded with software for a computer program that, when executed by a processor, cause the processor to generate control signals for controlling exterior lights of a controlled vehicle, by executing the steps comprising:

imaging a scene external and forward of the controlled vehicle and generating image data corresponding to the acquired images;

receiving and analyzing the image data in the processor to detect at least one characteristic of the image data to detect an oncoming semi-truck even when headlamps of the semi-truck are not detected; and generating a control signal from the processor that is used to control the exterior lights in response to analysis of the image data wherein, when a semi-truck is detected, the control signal indicates the detection of a semi-truck.

10. The non-transitory computer readable medium of claim 9 encoded with software for a computer program that, when executed by the processor, cause the processor to generate control signals for controlling exterior lights of a controlled vehicle, by executing the additional steps comprising:

further analyzing the image data in the processor to select a mode of operation, wherein one mode of operation is a motorway mode; and when in a motorway mode, generating a control signal for reducing the brightness of the exterior lights if an oncoming semi-truck is detected.

11. The non-transitory computer readable medium of claim 9, wherein the processor is further configured to analyze the image data to detect a semi-truck even when headlamps of the semi-truck are not detected.

12. The non-transitory computer readable medium of claim 11, wherein the step of receiving and analyzing the image data to detect an oncoming semi-truck detecting a semi-truck includes detecting groups of lights other than headlamps.

13. The non-transitory computer readable medium of claim 12, wherein the determination that detected lights belong in a group includes determining whether the lights are within a defined range of one another.

* * * * *